Patented Feb. 21, 1950

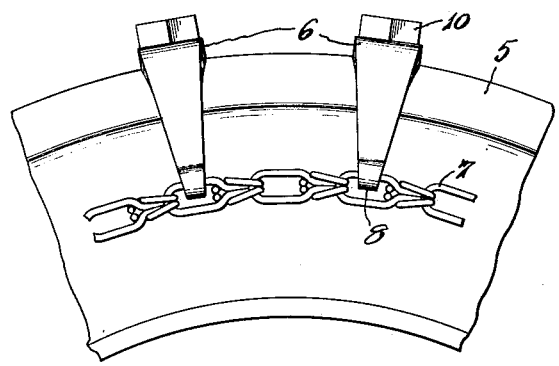
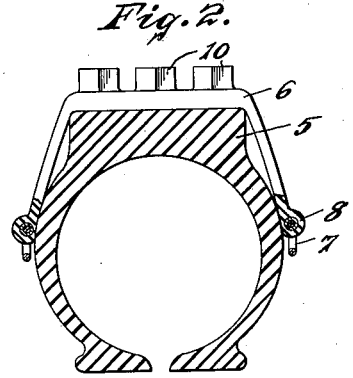
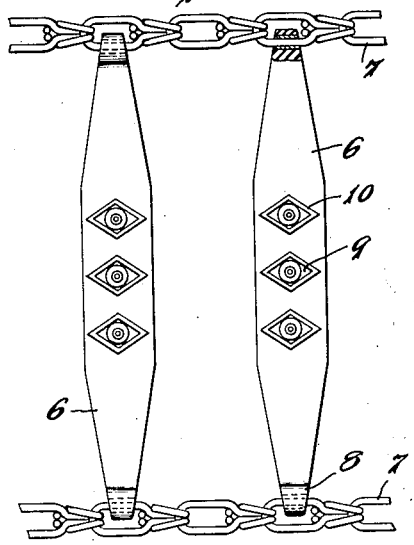
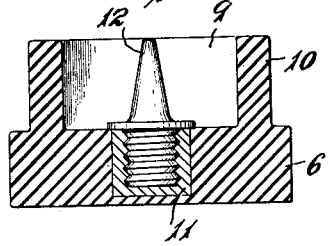
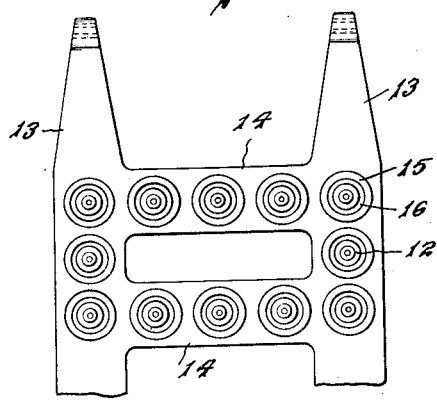

2,498,523

UNITED STATES PATENT OFFICE 2,498,523

TIRE CHAIN

Philip E. Bergen, Farmington, Conn.

Application November 13, 1947, Serial No. 785,581

2 Claims. (Cl. 152—222)

This invention relates to a tire chain and more particularly to chains intended for providing traction for tires of motor vehicles.

An object of this invention is to provide improved traction means which may be secured to a vehicle tire by means of conventional chains or the like.

A further object of the invention is to provide such traction means in the form of vacuum cups each having therein a calk for increasing the traction provided by the device in the manner fully described in my co-pending application S. No. 705,917, filed May 28, 1947, now abandoned.

Further objects and advantages of this invention will be more clearly understood from the following description and from the accompanying drawings, in which—

Fig. 1 is an elevational side view of a portion of a vehicle tire showing the manner in which my improved device is applied thereto.

Fig. 2 is an end view thereof in vertical section.

Fig. 3 is an elevational plan view of my improved chain device in opened position.

Fig. 4 is an elevational plan view of a modified form of the cross member for said chain embodying my invention.

Fig. 5 is an enlarged end view in vertical section through one of said cross straps illustrating the construction thereof.

As shown in the drawings the numeral 5 denotes a vehicle tire of conventional form such as used on automobiles.

A series of cross straps 6 are secured to opposite links of the side chains 7, of conventional form, by suitable means such as loops 8 at the ends of said straps.

My invention provides for said straps a series of vacuum cups including recesses 9 which may be formed by surrounding walls 10 of various shapes, such as the diamond shaped walls illustrated in Figs. 1 to 3.

In the bottoms of said recesses there is preferably provided a threaded bushing 11 which is embedded in the body of the strap and is threaded to detachably receive a calk 12 having a point extending vertically and terminating substantially on a plane with the top of the vacuum cup as clearly illustrated in Fig. 5.

It will be understood that the walls 10 of said cups being resilient will yield as they come into contact with the surface of a road and permit the point of the calk 12 to engage the said surface and thereby provide the intended traction for the tire.

In the form illustrated in Fig. 4, the straps 13 are formed in pairs and have between them connecting portions 14—14 which rest on and along the sides of the tread of the tire to provide added traction. These straps are provided with cups 15 which, as shown, have circular walls surrounding the recesses 16 in which the calks 12 are contained as above described.

I claim:

1. A tire chain of the character described comprising an elongated cross strap constructed of resilient material and having thereon a plurality of vertically projecting walls surrounding a recess, an insert embedded in the bottom of said recess, and a calk detachably threaded into each of said inserts and having a point extending upwardly therefrom substantially on a plane with the top of the annular wall to enable said point to engage the surface of the road when the said walls are compressed under the weight of the vehicle.

2. A tire chain of the character described comprising a plurality of cross straps each constructed of resilient material and having a plurality of spaced cups with resilient surrounding walls projecting upwardly from the surfaces of said straps to provide vacuum cups, an insert embedded in the bottom of each of said recesses, a calk having a stud threaded to said insert, and a base resting upon the said surface, and a projection extending upwardly from said base into a point coplanar with the upper edge of the surrounding wall.

PHILIP E. BERGEN.

REFERENCES CITED

The following references are of record in the file of this patent:

UNITED STATES PATENTS

| Number | Name | Date |
| --- | --- | --- |
| 1,398,975 | Renos | Dec. 6, 1921 |
| 1,733,963 | Herbert | Oct. 29, 1929 |

FOREIGN PATENTS

| Number | Country | Date |
| --- | --- | --- |
| 468,679 | France | July 11, 1914 |
| 479,988 | France | May 30, 1916 |